# United States Patent Office

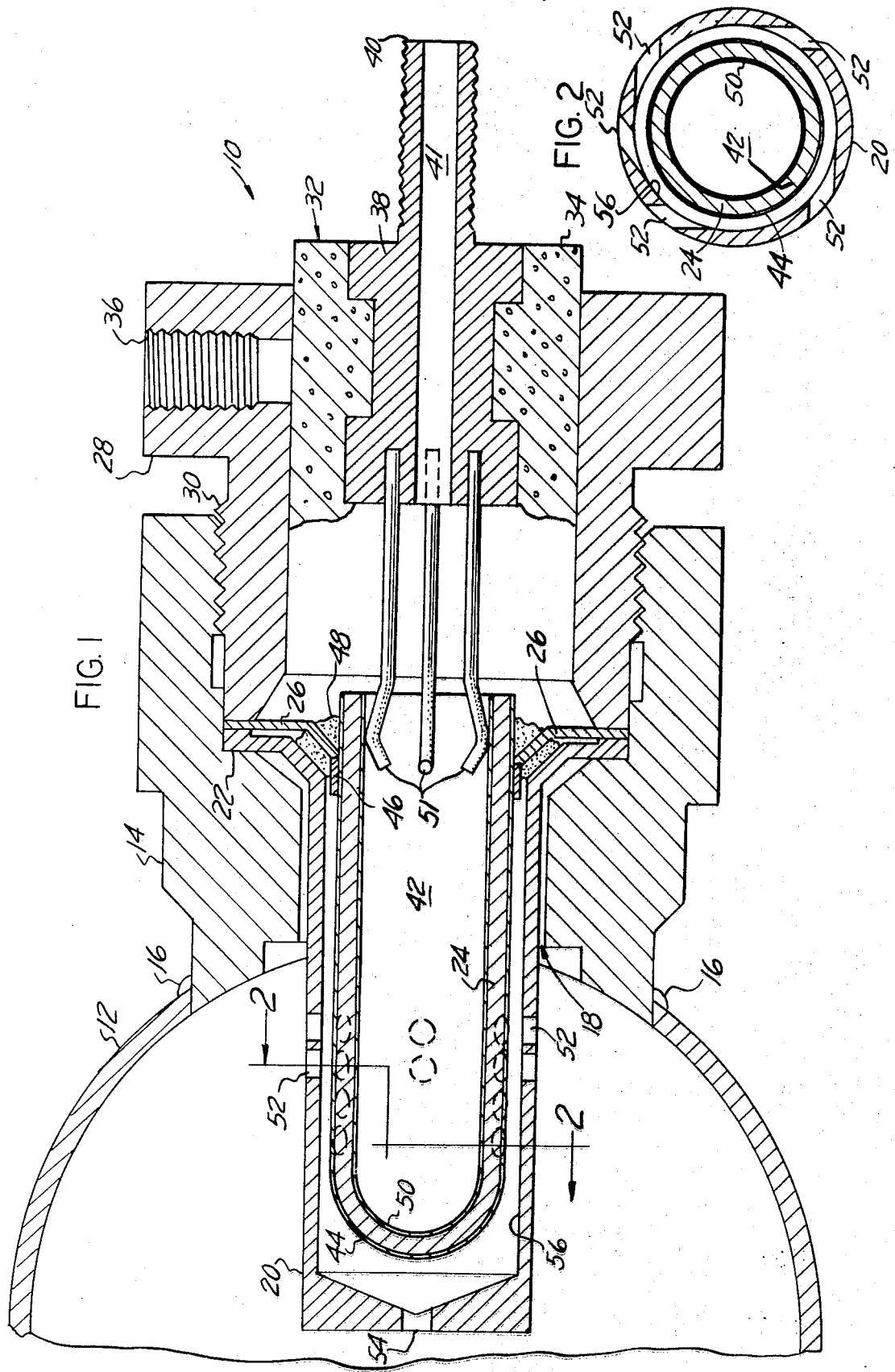

3,835,012
PROTECTIVE SHIELD FOR OXYGEN SENSOR
Thomas J. Hemak, Madison Heights, Mich., assignor to
The Bendix Corporation, Southfield, Mich.
Filed Aug. 28, 1972, Ser. No. 284,386
Int. Cl. G01n 27/46
U.S. Cl. 204—195 S                                   1 Claim

ABSTRACT OF THE DISCLOSURE

A heat distributive protective shield for a zirconium dioxide oxygen sensor, particularly for internal combustion engine exhaust systems, is illustrated. The shield is arranged in surrounding relationship with respect to the zirconium dioxide sensor body and is provided with a plurality of spaced perforations which are arranged to distribute the exhaust gas heating to the sensor body to provide uniform thermal stressing of the zirconium dioxide material. To this end, the distribution of the perforations provides a greater number of perforations in proximity to any bodies which would constitute a heat sink and a lower number of perforations remote from any heat sink material. The perforations may be arranged to provide for a swirling gas flow between the shield and the zirconium dioxide sensor body in order to prevent particulates from impinging upon the sensor surface.

BACKGROUND OF THE INVENTION

(1) Field of the Invention

The present invention is related to the field of oxygen sensors for sensing the oxygen concentration in a body of gas. More particularly, the present invention is related to that portion of the above-noted field which is particularly concerned with the sensing of oxygen concentrations which information may be used to indicate whether or not a combustible mixture was, or may be, combusted at the stoichiometric mixture ratio. More particularly, the present invention is related to an oxygen sensor for sensing the concentration of oxygen gas within the heated exhaust gas produced by an internal combustion engine.

(2) Description of the Prior Art

It is known that a body of zirconium dioxide which is exposed on one surface to a reference oxygen concentration and exposed on a second, opposed surface to an oxygen concentration to be sensed may, in the presence of thin porous electrically conductive coatings on the two surfaces, generate an electrical potential between the two surfaces which is indicative of the oxygen concentration of the surface to be sensed. That is to say that oxygen molecules will migrate through the zirconium dioxide material in the direction of the lowest oxygen concentration and in the course of this migration will deposit electrons on the surface coating exposed to the lower concentration in direct (though nonlinear) proportion to the number of oxygen molecules so migrating. The number of migrating oxygen molecules will be in relation to the differential oxygen concentrations. Examples of suitable zirconium dioxide materials are those available from the Zircoa Corporation designated types 1003SV available with both 8% and 16.9% yittrium oxide.

It has been proposed that the sensors above described may be inserted into the exhaust system of an internal combustion engine. By coating the surface of the zirconium dioxide body which is exposed to the exhaust gases with a catalytic metal material, such as platinum, the sensor will generate a relatively large output signal whenever the combustion mixture for the internal combustion engine has been at an air/fuel ratio less than the stoichiometric mixture ratio and will generate a relatively low signal whenever that mixture has been prepared with an air/fuel ratio greater than the stoichiometric mixture ratio. In other words, the sensor will generate an output signal having a virtual step function, going from high to low at the stoichiometric air/fuel mixture ratio, for increasing air/fuel ratios. However, the insertion of such a sensor into the exhaust system of an internal combustion engine results in the generation of a substantial heat gradient across the sensor body since the walls of the exhaust system are known in the neighborhood of two to five hundred degrees F. cooler than the interior gaseous streams (which may be, during normal operation anywhere from about 600° F. to about 1500° F.).

Zirconium dioxide is known to be a relatively weak material. In applying such a sensor to a heated environment such as the automotive exhaust system, it has become apparent that thermal stressing of the zirconium dioxide sensor body is a significant source of sensor failure. For such a sensor to be of any real value in an automotive application, it must be capable of withstanding extensive usage without replacement. The statistical failure rate based on thermal stressing alone suggests that such a sensor will not in fact have the desired life. Consequently, it is an object of the present invention to provide a mechanism for improving the sensor's capability of withstanding the automotive exhaust system environment for the desired statistical life capability.

A further problem with the application of such a sensor to an automotive exhaust system resides in the fact that the sensor, to give the desired step function output signal, must be coated with a catalytic metal material such as platinum which will promote continued combustion of any excess hydrocarbons. On the other hand, the automotive exhaust gas normally includes small solid particles of sulphur, phosphorus, and lead among others. These heated particles moving at the relatively high exhaust gas velocity, when impinging upon the thinly coated surface of the zirconium dioxide sensor body, will produce two effects deleterious to the sensor. They will either remove portions of the coating material by impact bombardment or, primarily in the case of lead, they will be plated out onto the coated surface thus destroying the catalytic capability of the coated surface since they will in effect be masking that surface from the exhaust gas. It is therefore an object of the present invention to provide a mechanism which will sufficiently insulate the catalytic metal coated surface from the particulates within the exhaust gas without destroying the efficiency of the catalytic surface.

SUMMARY OF THE INVENTION

In order to accomplish the objectives of the present invention, I have determined that a metal protective shield may be provided in surrounding relationship with the zirconium dioxide body and, if provided with a plurality of perforations which are spaced with the majority of the perforations in proximity to any heat sink material (for example the wall of the exhaust system and the mounting body of the sensor itself) a thermally uniform distribution of the exhaust gases surrounding the zirconium dioxide body may be obtained so that thermal stressing of the zirconium dioxide body is held at a minimum. Furthermore, providing these perforations in a generally tangential direction relative to the inner surface of this shielding body will cause a swirling or vortical motion of the exhaust gas around the sensor in such a fashion that the platable particulates in that exhaust gas will plate out on the surface of the shielding member rather than on the surface of the zirconium dioxide body. The velocity of other particles will be reduced to the point that when they eventually contact the catalytic metal material, their impact velocity will not be sufficiently high to remove that material. An additional perforation in the shielding member perpendicular to the general direction of the exhaust gas flow and remote from the heat sink material will promote exhaust gases to enter in proximity to the heat sink material, swirl about the coated surface and exit remote from the heat sink material to thereby further promote higher temperature heating of those portions of the sensor in thermal proximity to heat sink materials and which would normally be cooler.

BRIEF DESCRIPTION OF THE DRAWINGS

FIG. 1 illustrates an illustrative oxygen sensor incorporating the present invention in a sectional view taken substantially through the longitudinal axis of the sensor as applied to an internal combustion engine exhaust system.

FIG. 2 illustrates the shield of the present invention in a sectional view taken along the section line 2—2 of FIG. 1 illustrating the preferred perforation placement.

DETAILED DESCRIPTION OF THE PREFERRED EMBODIMENT

Referring now to FIGS. 1 and 2, the improved oxygen sensor according to the present invention is illustrated in a preferred embodiment 10 in association with a conduit 12 which may be, for example, the exhaust manifold or header of a conventional internal combustion engine exhaust system. A mounting member 14 is coupled to the exhaust pipe 12 by suitable means such as welding at 16 and is operative to provide an access opening 18 for insertion of the sensor 10 into the exhaust gas stream. The body 14 is adapted to receive a mating portion of the sensor 10.

The shield means 20 of the present invention is received within the opening 18 and is sized to come into abutment with a shoulder 22 of the mounting body 14 to prevent movement of the shield means 20 relative to mounting member 14. The zirconium dioxide sensor body 24 is inserted into the cavity provided therefor within the shield member 20 and is provided with a collar 26 arranged to be in contactive engagement with the shield member 20. The sensor housing 28 is provided with attachment means 30, here illustrated in the form of threads, for receipt by the mounting member 14 so as to compressively confine the shield 20 and the sensor body 24 within the mounting member 14.

Electrical means 32 having an insulating portion 34 are provided for insertion within the sensor housing 28 and a set screw 36 is arranged to permanently retain the electrical means 32 within the sensor housing 28. Electrical means 32 further are provided with a conducting member 38 having an extending conduit portion 40 with a passage 41 extending through member 38 which passage is operative to communicate the interior region of the sensor, identified as 42, with a source of reference gas which may conveniently be the atmosphere. For convenience, the conduit 40 is provided on an outer surface with means to facilitate atachment of an electrical signal lead and a communicating hose or attachment device which may for example communicate the interior region 42 to a source of filtered air such as the interior of the normally provided air cleaner to prevent contamination of the interior region 42 of the sensor 10. Insulating means 34 may be for example a ceramic cement such as Sauereisen #31 cement.

The zirconium dioxide sensor body 24 is coated on its outer surface 44 with a thin porous layer of a suitable electrically conducting catalytic material, such as platinum, in order to facilitate a combustion process at its surface as will be described hereinbelow while permitting the flow of oxygen molecules. The collar member 26 is then attached to this coated surface by any convenient means which may be as illustrated here through compression ring member 46 so that the collar member 26 is in electrical contact with the coating 44. In order to provide a seal capable of withstanding the temperature environment and which is compatible with the thermal expansion characteristics of the zirconium dioxide, a suitable glass seal 48 (such as Corning glass 7056 available from the Corning Glass Works, Corning, N.Y.) is used. The interior surface of the zirconium dioxide body is coated with a thin porous layer 50 of a suitable conductive material which may also be platinum but which may in the alternative be silver or such other metal selected for its electrical conductivity, ability to be applied in thin porous layers, and capability of withstanding the particular temperature environment expected for the sensor.

Extending from the conducting body or member 38 are a plurality of spring fingers 51 which are arranged to extend into the interior region 42 of the zirconium dioxide sensor body 24 and are biased into contact with the interior electrical conducting coating 50.

The sensor as hereinabove described would operate as follows. The interior region 42 of the sensor body 24 will be exposed through the conduit 41 to a source of atmospheric air which is known to have an oxygen concentration of approximately 21%. In the presence of a flow of exhaust gases through the gas conduit 12, the exterior surface 44 of the zirconium dioxide sensor body 24 will be exposed to a gas having an oxygen concentration substantially below that present in the interior 42 and which may be as low as 0%. Oxygen molecules will migrate through the zirconium dioxide sensor body from the interior region 42 to the surface coating and the number of oxygen molecules so migrating will be a direct function of the differential oxygen concentrations. These molecules will transport electrical charges to the exterior coating 44 resulting in a voltage potential difference between the interior coating 50 and the exterior coating 44. Since the exterior coating 44 is in electrically conductive contact with the chassis of the vehicle, chassis ground, this will result in the interior coating 50 accumulating a positive charge with respect to chassis ground. The magnitude of this voltage potential difference will be a function of the number of oxygen molecules migrating to the exterior coating and will therefore be a direct function of the oxygen concentration present within the exhaust system 12. Since the exhaust systems of automotive vehicles operating at an air/fuel ratio richer than the stoichiometric mixture value have theoretically zero oxygen concentrations and also have an excess of unreacted fuel, as each oxygen molecule enters the exhaust system through the exterior coating 44, it will be immediately reacted with an available fuel molecule due to the catalytic action of the surface coating and the oxygen concentration present at the surface coating 44 will remain essentially zero for all values of air/fuel ratios less than the stoichiometric mixture value. However, at the stoichiometric mixture value, there should be no available fuel molecules for reaction with the arriving oxygen molecules and for further increasing air/fuel ratios, an oxygen concentration will accumulate in the vicinity of surface coating 44. This will result in a reduced migration of oxygen molecules thereby substantially reducing the output signal which may be derived from this device.

With the addition of the shield member 20 according to the present invention, the operational description in the preceding paragraph will not be substantially altered since the shield member 20 is provided with a plurality of perforations 52. As can be seen from examination of FIG. 1, a large proportion of the perforations 52 are arranged in proximity to the mounting member 14 while a substantially lesser number of these perforations are present in the shield member 20 at locations more remote from the mounting member 14. Furthermore, the portion of shield member 20 which is most remote from the mounting member 14 is provided with only a single perforation 54 which operates as an exit passage. These perforations provide that a large proportion of the high temperature exhaust gas stream will come into contact with the sensor body 24 in proximity to the mounting member 14 and that a lower proportion of the high temperature exhaust gases will come into contact with the sensor body 24 at points more remote from the mounting member 14 so that the exhaust gas flow over the surface 44 will be substantially from the areas in proximity to mounting member 14 away from mounting member 14. This will have the effect of providing a substantially large quantity of heat to that portion of the sensor body 24 which is most accessible to the heat sink provided by mounting member 14 and that lower quantities of heat will be provided to that portion of the sensor body 24 remote from the sink. This provides a far more uniform heat distribution across and through the zirconium dioxide sensor body 24 to reduce the thermal stressing thereof. Additionally, exhaust perforation 54 is illustrated as being provided in shield member 20 with the access of the perforation 54 arranged to be substantially perpendicular to the flow of gases through the exhaust system so that this flow of exhaust gases will operate to draw the exhaust gases through the interior of the shield member 20 from perforations 52 out through exhaust perforation 54. Thus, exhaust perforation 54 further aides the flow of exhaust gases about the surface of coating 44 to facilitate the uniform heat distribution provided by the shield member of the present invention.

Referring now in particular to FIG. 2, the perforations 52 are illustrated as being arranged substantially tangentially to the interior surface 56 of the shield member 20. This arrangement of perforations provides that the entering exhaust gases will be directed in a vortical or swirling motion around the surface coating 44 in order to prevent the high speed impingement of particles within the exhaust gas from affecting the operation of the surface coating 44 throughout the life of the sensor. The zirconium dioxide sensor body 24 illustrated in the instant application is a substantially tubular member having a hemispherical end portion which extends approximately one-half of the way into the exhaust gas stream present within exhaust conduit 12. A shield member 20 provided for such a sensor configuration is preferably provided with a large number of perforations in proximity to the heat sink provided by mounting member 14 while a substantially smaller perforation area is provided at points more remote from mounting member 14 and the most extreme portion of the zirconium dioxide sensor body is completely shielded from the heating effects of the heated exhaust stream by the absence of perforations. This results in the entry of larger quantities of heated exhaust gases nearer the mounting member 14 and the passage of these exhaust gases over the more remote portions of the zirconium dioxide body 24. These more remote portions are exposed to a cooler exhaust gas than are the portions in proximity to the mounting member 14 but the overall temperature gradient is very low since the portions of the zirconium dioxide body exposed to higher temperatures are also in thermal contact with the heat sink of mounting member 14.

The precise placement and distribution as well as the areas of the perforations 52 is dependent upon the expected temperature gradient in the environment in which the sensor is placed and upon the heat sink characteristics of the mounting member 14 and its associated hardware. As applied to the exhaust system of an internal combustion engine, the above characteristics vary depending upon engine displacement and design and upon proximity of the sensor to the exhaust ports of the engine. Thus distribution of perforation areas which is adequate for a sensor associated with the header pipe of a small engine may, or may not, be suitable for a similar sensor associated with the exhaust manifold of a larger engine and for any given engine design optimum perforation arrangement may be derived with a minimum of experimentation after determining the preferred sensor location within the exhaust system.

What is claimed is:

1. A sensor for sensing oxygen concentration in a stream of heated exhaust gases in the exhaust conduit of an internal combustion engine and generating an electrical signal in response thereto, said sensor comprising:
   a housing adapted to be attached to an opening in the exhaust conduit;
   a zirconium dioxide body connected to said housing extending through said opening into the exhaust conduit, said body having an electrically conductive catalytic agent on a first surface for exposure to the exhaust gas and an electrically conductive material on a second surface for exposure to a reference gas;
   electrical conducting means connected to said surfaces on said body and extending therefrom through said housing for conducting the electrical signal generated in response to the difference in oxygen concentration adjacent said two surfaces;
   a tubular shield member having an interior surface spaced from said first surface and enclosing said body, said shield member having one end open and sealed in said housing and a gas flow exit aperture in the other end having a cross-sectional area less than the cross-sectional area of said body; and
   gas flow directing means comprising a plurality of performations in said shield member arranged substantially tangentially to said interior surface, said perforations cooperating with said gas flow exit aperture and positioned for directing the flow of exhaust gases into a swirling motion around said first surface in the space between said first surface and said interior surface of said shield member and out of said gas flow exit aperture.

References Cited

UNITED STATES PATENTS

| | | | |
|---|---|---|---|
| 3,546,086 | 12/1970 | Sayles | 204—195 S |
| 3,738,341 | 6/1973 | Loos | 204—195 S |
| 3,768,259 | 10/1973 | Carnahan et al. | 204—1 T |
| 3,468,780 | 9/1969 | Fischer | 204—195 S |
| 3,720,594 | 3/1973 | Wilson | 204—195 S |
| 3,598,711 | 8/1971 | Flais | 204—195 S |

TA–HSUNG TUNG, Primary Examiner

U.S. Cl. X.R.

123—119 E